(12) United States Patent
Scherzer

(10) Patent No.: US 7,801,490 B1
(45) Date of Patent: Sep. 21, 2010

(54) INTERFERENCE BASED SCHEDULING USING COGNITIVE RADIOS

(75) Inventor: Shimon B. Scherzer, Los Gatos, CA (US)

(73) Assignee: Hewlett-Packard Company, Palo Alto, CA (US)

(*) Notice: Subject to any disclaimer, the term of this patent is extended or adjusted under 35 U.S.C. 154(b) by 1770 days.

(21) Appl. No.: 10/803,172

(22) Filed: Mar. 17, 2004

(51) Int. Cl.
*H04B 17/00* (2006.01)

(52) U.S. Cl. .............. 455/67.13; 455/226.2; 455/226.3; 455/452.1; 455/452.2; 370/328; 370/329; 370/330

(58) Field of Classification Search ............... 455/446, 455/450, 452.1, 452.2
See application file for complete search history.

(56) References Cited

U.S. PATENT DOCUMENTS

| | | | |
|---|---|---|---|
| 6,262,980 B1* | 7/2001 | Leung et al. ............... 370/336 |
| 6,798,761 B2* | 9/2004 | Cain et al. ................... 370/337 |
| 2002/0041566 A1* | 4/2002 | Yang et al. ................... 370/229 |
| 2003/0078051 A1* | 4/2003 | Fattouch ...................... 455/452 |
| 2004/0224677 A1* | 11/2004 | Kuchibhotla et al. ...... 455/422.1 |
| 2006/0002360 A1* | 1/2006 | Ji et al. ........................ 370/343 |

\* cited by examiner

*Primary Examiner*—Temica M Beamer

(57) ABSTRACT

Disclosed are systems and methods which implement communication scheduling to reduce service level variance associated with interference. In providing communication scheduling according to embodiments, mult-channel coverage may be provided throughout all portions of a service area to facilitate resource flexibility. According to embodiments, interference metrics are collected in real time for use in scheduling decisions. Synchronized point to multipoint wireless network protocols may be used to facilitate interference metric collection and/or communication scheduling. Uplink and/or downlink communications may be scheduled using one or more diversity attribute in order to achieve a desired level of bandwidth throughput, communication service level variance, and/or communication reliability in spite of the presence of unpredictable interference in the spectrum.

71 Claims, 5 Drawing Sheets

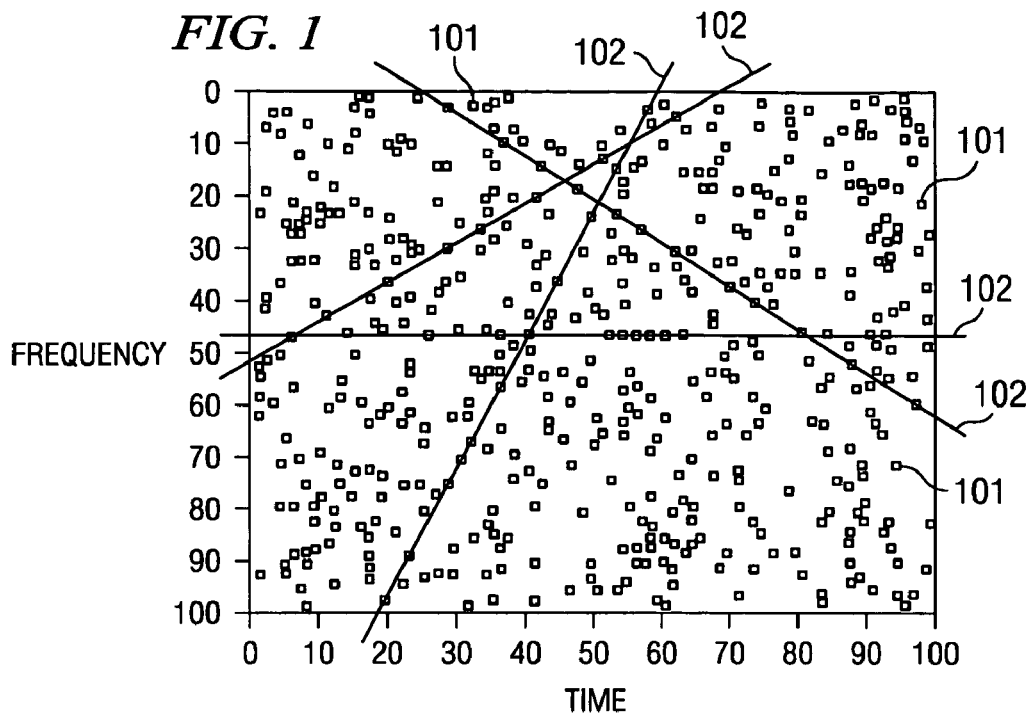

INTERFERENCE BASED SCHEDULING USING COGNITIVE RADIOS

CROSS-REFERENCE TO RELATED APPLICATIONS

The present application is related to co-pending and commonly assigned U.S. patent application Ser. No. 10/306,972 entitled "Space-Time-Power Scheduling for Wireless Networks," filed Nov. 27, 2002, and Ser. No. 10/730,649 entitled "System and Method for Interference Mitigation for Wireless Communication," filed Dec. 8, 2003, the disclosures of which are incorporated herein by reference.

TECHNICAL FIELD

The invention relates generally to wireless communication and, more particularly, to increasing system bandwidth controlling service level variability in wireless communication system using cognitive radios and interference based scheduling.

BACKGROUND OF THE INVENTION

The use of wireless communication links, whether for video, voice, or data, have become prevalent in recent years, particularly in light of the widespread adoption of mobile technology, such as cellular telephones, laptop computers, personal digital assistants (PDAs), pagers, and the like. Wireless communication links are particularly desirable with respect to some situations, such as to avoid obstacles associated with laying cable between communication nodes, providing freedom of movement, etcetera. Accordingly, wireless communication links have been given much consideration by communication infrastructure providers. However, deploying wireless communication links is not without difficulty. In particular, wireless spectrum is often highly regulated and may be prone to interference.

Wireless broadband access has been considered quite extensively in recent years. Although multiple solutions have been experimented with, attempts at providing wireless broadband access, particularly widespread access, has generally not met with commercial success due to inadequate economical conditions, i.e., high cost without sufficient demand. In particular, the need for licensed spectrum in which to provide wireless links has typically resulted in high costs to wireless broadband access providers. Moreover, past wireless broadband access solutions have typically implemented non-standard or application specific equipment, due to each provider developing a unique solution tailored to their particular situation, circumstances, and spectrum, thereby preventing economies of scale and compatibility.

Demand for such wireless broadband access has generally been associated with applications and appears to be correlated to at least some degree to the cost of the service and equipment, the complexity of the implementation, and the reliability of the links. The proliferation of wired broadband access, such as via cable modem and digital subscriber line (DSL), is stimulating the creation of applications requiring relatively large amounts of bandwidth, such as music downloading, video streaming, multi-media presentations, etcetera. However, a large number of nodes and/or locations desirous of implementing such emerging applications are not yet wired for broadband access and, therefore, cannot adequately access such applications.

Two related wireless technologies are beginning to gain acceptance in providing at least some level of wireless broadband access, these being wireless technologies based on the Institute of Electronic and Electrical Engineers (IEEE) 802.11 and 802.16 standards, which are incorporated herein by reference. The 802.11 standard is directed toward indoor applications and sets forth asynchronous protocols for short range communications, while the 802.16 standard is directed toward outdoor applications and sets forth synchronous protocols for longer range communications, each being operable in unlicensed spectrum such as within the 2 to 11 GHz range. Implementation of such standards facilitates equipment cost reduction by providing for compatibility and economy of scale. However, technologies adopting the foregoing standards heretofore have not adequately addressed the issues associated with commercial or economic deployment of wireless broadband access. For example, although addressing aspects such as communication protocols, the standards alone do not provide for spectrum utilization suitable for reliable or large scale wireless broadband access.

Traditional wireless services rely upon licensed spectrum, in which the use of the spectrum is highly regulated such that sources of interference are avoided, in order to provide for spectrum utilization suitable for reliable or large scale access. However, that spectrum is expensive and is very difficult to obtain. Unlicensed bands, although providing an abundant, readily available, and inexpensive alternative, present a challenge in that the spectrum is open to many simultaneous uses and thus prone to unpredictable interference leading to link degradation and even blocking. Such link degradation and blockages are typically not experienced uniformly throughout the wireless links of a communication network, often resulting in a high degree of service level variance experienced by users. That is, although unlicensed spectrum can provide an enormous amount of transmission bandwidth, bandwidth variance resulting from interference presents a significant challenge to the successful use of this spectrum.

Channel planning is a traditional approach that has been used, such as by cellular network providers, to avoid and/or mitigate interference issues. Accordingly, channel planning has been considered for use with respect to multiple operators' use of unlicensed spectrum. Unfortunately, channel planning (at least when used alone) is inadequate for many unlicensed spectrum networks because un-cooperative radio sources are present (i.e., those not abiding by the channel planning scheme). Moreover, channel planning schemes typically contradict channel agility and consequently greatly reduce the ability to avoid interference by changing operating channels.

The typical approach to avoid interference within unlicensed spectrum is to limit the transmission power as defined by FCC part 15 sections 15247 and 15249. In this "brut-force" approach the transmission power is limited to very low level, thereby reducing service coverage and buildings penetration rendering broad band service over unlicensed spectrum almost impractical.

Other prior attempts to address interference have included adjusting data rates based on frame drop rate feedback, such as where a transmitter monitors the rate of dropped frames (e.g., based on ARQ reports). For example, when a dropped frame rate is below certain target value, the transmitter may increase the data rate and visa versa for dropped frame rates that are above this value. A transmitter may use a substantial amount of time to determine the dropped frame rate (e.g., tens of frames for statistically sufficient sample). When multiple subscriber stations (N) are being served, the time for determining the dropped frame rate is increased by factor of N. In addition, re-transmit "timer" values implemented by many ARQ based protocols add to the delay between the frame dropping events and the associated reports. Consequently the transmitter reaction to an increase or decrease in frame drop rate is often relatively slow. The foregoing is aggravated when a subscriber station's link budget is highly variable, such as may result from variable distance and shadowing. In operation according to such prior attempts at providing adjustable data rates, when a channel is clear of interference even subscriber stations that have relatively good reception (signal to noise ratio) are being served with much lower data rate that their link budget allows. Moreover, when a channel is frequently interrupted by interfering signals with a substantial duty cycle, the transmitter is most likely unable to track the frame drop rate changes and the resulting operation will be to adjust the data rate to the minimum possible.

Accordingly, a need exists in the art for systems and methods providing for utilization of spectrum suitable for reliable and/or large scale wireless access. Particularly, a need exists in the art for systems and methods which provide acceptable levels of communication services to all subscribers in light of unpredictable interference associated with the use of unlicensed bands. A further need exists in the art for systems and methods utilizing spectrum prone to interference without implementing channel planning regimes.

BRIEF SUMMARY OF THE INVENTION

The present invention is directed to systems and methods which implement communication scheduling to reduce service level variance associated with interference. Interference metrics are preferably collected in real time for use in scheduling decisions.

According to embodiments of the invention, broadband wireless access (BWA) is provided independent of channel planning or very low transmission power limits. For example, each communication channel of a communication network may be available for use in all or many portions of the service area. However, limited loading is preferably implemented with respect to such channels (e.g., where 3 communication channels are available, loading may be less than ⅓ of the time with respect to each such channel). Although it may appear that the foregoing loading scheme would result in the same amount of spectrum utilization efficiency as a channel planning scheme wherein each communication channel is available only in a limited portion of a service area, the forgoing loading approach provides for significant trunking and diversity gain efficiency relative to the traditional channel planning. According to one embodiment, different operators may coordinate percentage spectrum usage rather than channel usage. Consequently the number of service providers in a given location is not limited by the number of available channels.

Broadband wireless access is provided, according to embodiments of the present invention, using wireless network nodes adapted to implement one or more diversity attribute, e.g., time diversity, space diversity, frequency diversity, angular diversity, and/or code diversity, to facilitate communication opportunities in public spectrum (i.e., unlicensed bands) or other interference prone bands. Multiple channels are preferably used everywhere without traditional frequency planning, providing extended operation room. Capitalizing on this, uplink and/or downlink communications are scheduled according to embodiments of the invention using one or more diversity attribute in order to achieve a desired level of bandwidth throughput, communication service level uniformity (e.g., throughput variability), and/or communication reliability in spite of the presence of unpredictable interference in the spectrum.

Embodiments utilize synchronized point to multipoint (PIMP) wireless network protocols, such as those based on the IEEE 802.16 standard, to facilitate interference metric collection and/or communication scheduling according to the invention. For example, a synchronized PTMP system may provide a control channel which is constantly (e.g., in fixed time intervals) broadcast by a base transceiver station (BTS) to all subscriber station terminals (SSTs). The broadcast of such a control channel may be utilized not only for providing scheduling information to the SSTs, but also to facilitate real time link condition measurement (channel estimation) by the SSTs due to its deterministic nature. According to preferred embodiments, SSTs transmit channel quality measurements or estimates (CQM) (also referred to herein as "channel feedback") which include real time interference metrics to a BTS selectively, such as when a feedback data slot is allocated to an SST by the BTS as may be indicated by the control channel. The interference metrics of the channel feedback are preferably used by the BTS to schedule transmission to and from SSTs.

Additionally, the BTS may use transmission of the channel feedback by a SST to estimate the instantaneous and average interference level associated with the SST at the BTS RX port. This can be used by the BTS to further schedule the SSTs transmission to the BTS based on their ability to deliver their data through the channel.

Scheduling of SST to BTS transmission and/or BTS to SST transmission according to embodiments of the invention is not based exclusively on a channel quality estimate level according to embodiments of the invention. For example, although at least some minimal level of channel quality may be desired in order to ensure that scheduled communications have a reasonable probability of reception by the intended target, scheduling according to preferred embodiments may not be based upon a SST having a highest channel quality estimate. Accordingly, although a maximum possible bandwidth throughput may not be achieved, embodiments of the invention provide scheduling priority to SSTs having lower channel quality estimates associated therewith, in order to achieve a minimum service level with respect to service levels experienced by the SSTs. However, a preferred embodiment BTS schedules transmission bandwidth such that SSTs reporting better channel quality estimates which are scheduled for communications are to get higher bandwidth. Accordingly, embodiments of a scheduling scheme of the present invention operates to attempt to maximize network bandwidth while assuring minimum level of service to all SSTs. Although maximizing bandwidth and guaranteeing minimum service are generally two conflicting targets, the techniques of preferred embodiments operate to find a best compromise.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows a graph representing interference problems associated with the use of publicly available spectrum;

FIG. 2A shows a service level verses service level probability curve representing interference problems associated with the use of publicly available spectrum;

DETAILED DESCRIPTION OF THE INVENTION

Figure 2B:
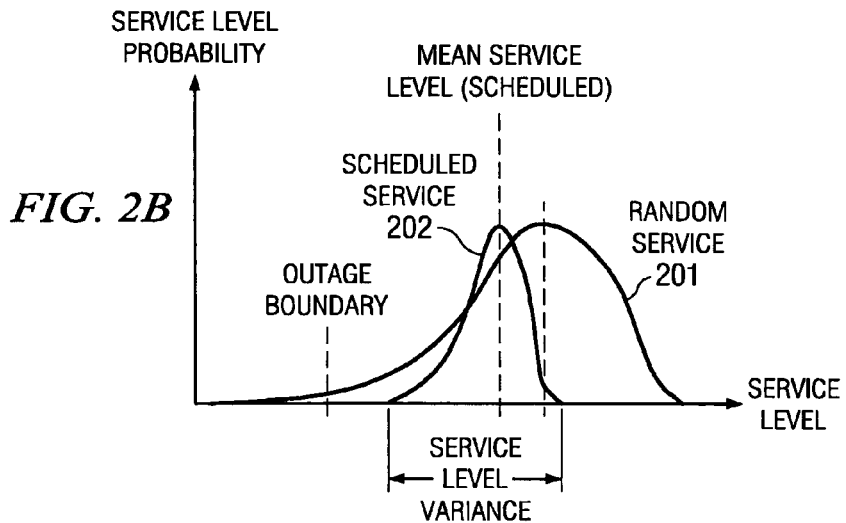
FIG. 2B shows a service level verses service level probability curve having reduced service level variability as may be achieved through implementation of embodiments of the present invention.

Unlicensed spectrum presents a vast resource which may be utilized for broadband wireless access (BWA). However, due to the inability to control interference in such publicly available spectrum, it is difficult to guarantee quality of service. The frequency spectrum allocated for public use in the United States is theoretically capable of supporting a very large amount of average bandwidth, such as on the order of 1 Mb/s average per subscriber in normal urban density situations. Although the average bandwidth which may theoretically be achieved is large, the variance of the quality of service from subscriber to subscriber and/or throughout time associated with that bandwidth is large as well. For example, un-coordinated co-channel transmissions, or interference, in the publicly available spectrum presents a significant barrier to its use. Accordingly, there is a significant probability that service may not be delivered as expected in a system which utilizes public spectrum for broadband wireless access.

FIG. 1 graphically represents interference problems associated with the use of publicly available spectrum. The axes of the graph in FIG. 1 represent time (horizontal) and frequency (vertical) and cluster points 101 represent interference. Lines 102 represent various possible uses of frequency over time for conducting wireless communications. Although a significant amount of each of lines 102 is free of interference, each of lines 102 experiences appreciable interference (intersects a plurality of cluster points 101). Subscribers to broadband access services typically expect high levels of service and reliability, such as on the order of 99.99% (sometimes referred to as "four-nines") availability. Accordingly, the interference illustrated in FIG. 1 may represent blockage or service levels falling below a minimum acceptable threshold on the order of 5-10% of the time. Although perhaps initially appearing relatively minor, the interference represented in FIG. 1 can result in the whole service becoming questionable because the service level demanded by subscribers cannot be predictably and reliably met.

The service level verses service level probability curve of FIG. 2A further illustrates the above point. Specifically, curve 201 represents a plot of the probability (vertical axis) of a subscriber experiencing a particular level of service (horizontal axis) provided in a communication to/from a subscriber, i.e., a probability density function of service. As shown in FIG. 2A, a relatively high mean level of service may be achieved, suggesting that a large number of subscribers will experience an acceptably high level of service much of the time. However, FIG. 2A also shows an appreciable number of subscribers will experience a level of service falling below an outage boundary some of the time. That is, the probability density function of FIG. 2A provides a large variance in service levels experienced by subscribers.

In developing embodiments of the present invention, it was realized that the problem with use of publicly available spectrum in providing broadband wireless access does not lie exclusively in the ability to provide a high average level of service, but includes minimizing service level variance. Although an appreciably high average level of service is likely to be expected in a broadband wireless access system, embodiments of the present invention balance providing a high average level of service with ensuring that all subscribers experience a higher minimum level of service through implementing communication scheduling techniques, thereby trading a marginal increase in average level of service for decreased service level variance.

FIG. 2B illustrates the above described trade of increased average level of service for decreased service level variance. Specifically, curve 202 represents a plot of the probability of a subscriber experiencing a particular level of service provided in a communication to/from a subscriber when scheduling techniques of embodiments of the present invention are implemented. As can be seen by the superimposition of curve 202 on curve 201, the probability density function of curve 202 provides less service level variance, although providing a marginally lower average service level. Of particular interest in FIG. 2B is the fact that curve 202, with its reduced service level variance, does not result in any subscriber experiencing a service level below that of the outage boundary, thereby resulting in a system which meets the aforementioned expected four-nines level of service and reliability. Accordingly, embodiments of the present invention provide broadband wireless access operation that mitigates unlicensed spectrum related interference effects and increases system bandwidth.

In implementing systems and methods to provide broadband wireless access having reduced service level variance according to embodiments of the present invention while maintaining an acceptably high average service level, interference mitigation techniques, such as those shown and described in the above referenced patent application entitled "System and Method for Interference Mitigation for Wireless Communication," may be employed. Specifically, interference mitigation techniques may be employed to provide a high average service level, which then may be marginally lowered through use of scheduling techniques of the present invention in order to provide reduced service level variance.

Embodiments of the present invention make all communication channels, or a plurality of communication channels, available in any service area, and implement limited loading techniques such that each channel is used only a fraction of the time. This approach provides for significant trunking efficiency and diversity gain relative to traditional channel planning techniques where each base transceiver station (BTS) uses a different channel from its neighbors. Trunking efficiency is increased according to embodiments by the fact that all channels are available everywhere and different base stations or sectors can share the channels. It should be appreciated that when one base station or sector needs more bandwidth other base stations or sections are likely to need less since the desired bandwidth is not correlated. Diversity gain is achieved according to embodiments since each subscriber station can select a best channel any time unconditional of what other subscriber stations are doing (in a conventional approach a sector channel may need to be changed to accommodate a single or group of subscriber stations).

Additionally, embodiments of the present invention utilize various system resources providing sources of diversity, such as time diversity, space diversity, and/or frequency diversity, to provide degrees of freedom with respect to supporting desired communication links. In effectively utilizing the foregoing sources of diversity, embodiments of the present invention implement multiple forms of scheduling. For example, a first form of scheduling operates to coordinate transmissions within the system (such as shown and described in the above referenced patent application entitled "System and Method for Interference Mitigation for Wireless Communication"). This form of scheduling may be utilized to provide a high average level of service by taking advantage of alternative resources (diversity gain), such as through intelligent assignment of channels, antenna beams, time slots, communication codes, etcetera. A second form of scheduling may be based upon interference, such as using real time scheduling and/or scheduling based on long term statistics. The effectiveness of this second form of scheduling according to some embodiments may be dependent upon effective execution of the above mentioned first form of scheduling. For example, the ability of operation of the first form of scheduling to easily migrate a subscriber station's connection to a channel having better link quality (e.g., carrier to interference (C/I)) without forcing other subscriber stations to do the same facilitates effective operation of the second form of scheduling. Likewise, effective execution of the first form of scheduling may enhance the ability of the second form of scheduling to sort "strong" connections to high interference conditions (e.g., time and frequency) while migrating "weak" connections to low interference channels. Flexibility in assigning subscriber stations to particular channels by operation of the first form of scheduling may be utilized to realize increased trunking efficiency in operation of the second form of scheduling. Accordingly, it should be appreciated that adding resource flexibility and scheduling the resources properly according to embodiments of the invention increases the systems ability to guarantee a minimum service level. That is, service level variance can be significantly reduced, thereby minimizing outage probability.

To efficiently exploit these resources, embodiments of the invention use a synchronized point to multipoint (PTMP) wireless network protocol, such as that set forth in the IEEE 802.16 standard. A synchronized PTMP wireless network protocol utilized according to an embodiment of the present invention provides a control channel which is constantly (e.g., in fixed time intervals in a time division multiple access (TDMA) system) broadcast to all subscriber station terminals (SST). The control channel may transmit system information such as an uplink map, a downlink map, etcetera. An example of a time division duplex (TDD) frame structure, such as may be implemented in a TDMA system, which includes a control channel is shown in FIG. 3.

Figure 3:
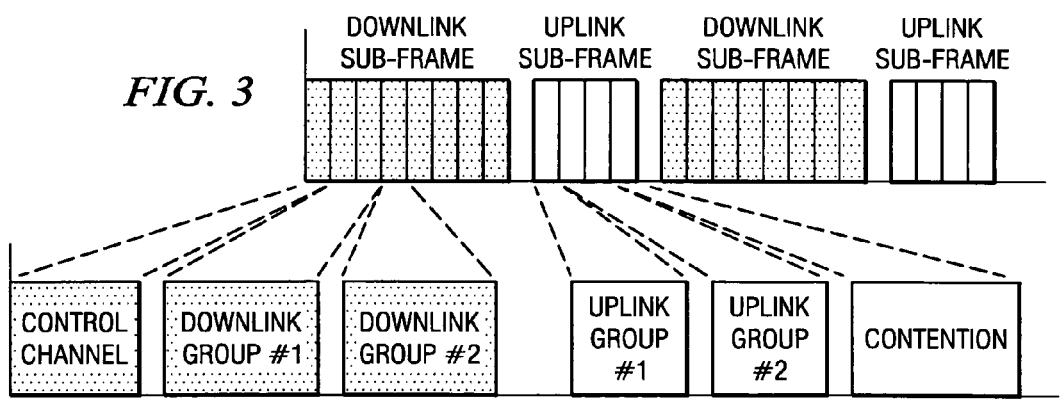
FIG. 3 shows a time division duplex (TDD) frame structure useful according to embodiments of the present invention.

The TDD frame illustrated in FIG. 3 incorporates a downlink sub-frame and an uplink sub-frame. The control channel of the illustrated embodiment is part of the downlink sub-frame. The rest of the downlink sub-frame may be used for data being transmitted from a base station to subscriber stations. For example, each downlink group may be addressed to a specific subscriber station. The uplink sub-frame may be used to carry data from subscriber stations to the base station. In addition, some slots can be allocated for contention traffic from subscriber stations to the base station (e.g., bandwidth requests etc.).

It should be appreciated that implementations other than time division, such as code division and/or frequency division, may be utilized in providing control channels suitable for use according to embodiments of the present invention. However, an important aspect of a control channel utilized according to embodiments of the invention is that the control channel have a deterministic nature, such that subscriber stations can expect the control channel message to predictably be present, such as predictable in time/code/frequency.

Deterministic characteristics of a preferred embodiment control channel makes the control channel useful in channel estimation at the subscriber stations, in addition to providing a reliable scheduling and information transport tool. For example, the subscriber stations of a wireless network may each monitor the control channel, using time predictable/deterministic messages associated therewith to monitor downlink metrics and thereby make channel quality estimates. Channel quality estimations may be based upon a percentage of reception of the control channel according to one embodiment. For example, reception of a periodic control channel 5 times out of 10 by a subscriber station may be utilized to indicate a level of interference on the downlink of about 50%. This interference information may therefore be translated into a channel quality metric (CQM). Additional or alternative metrics, as discussed below, may be used according to embodiments of the invention.

It may be preferred that all subscriber stations transmit channel quality estimates or channel feedback to a corresponding base station all the time. However, this may consume excessive channel bandwidth when many subscriber stations are present. To avoid the unnecessary consumption of uplink channel bandwidth, control may be provided such that selective subscriber stations send channel feedback at any particular time according to embodiments of the invention. For example, when data is available at a BTS for any particular SST, a feedback data slot may be allocated to the SST for communication of channel feedback before transmission of the aforementioned data. In such a configuration, SSTs that are currently being served may constantly send channel quality information to the BTS. Additionally or alternatively, other feedback data slot assignment schemes may be implemented, such as to provide a feedback data slot for every SST periodically. For example, when a system implements relatively short time slots for communication, such as on the order of 2 milliseconds, subscriber station feedback may be generated approximately every 20 milliseconds to facilitate efficient transmission scheduling in both the downlink and uplink. The foregoing channel feed back may be transmitted by a subscriber station on one or more selected channels. For example, the channel feed back may be transmitted using an uplink control channel. Additionally or alternatively, the channel feed back message may be transmitted using a communication channel otherwise available for payload, such as to provide instantaneous interference in formation with respect to a particular channel expected to be assigned to the subscriber station.

The foregoing channel feedback is preferably used by the base station to schedule transmission to the subscriber stations. For example, according to embodiments of the invention, a base station may use the channel feedback signal transmitted by a subscriber station to estimate the instantaneous interference level associated with the subscriber station as experienced by the base station receiver port. This instantaneous interference information may be used by the base station in scheduling subscriber station transmissions to the base station based on the subscriber station's ability to deliver their data. For example, SSTs that have better link budget and/or higher TX power may be scheduled when the interference is high and visa versa. Accordingly, scheduling of subscriber station transmissions using the foregoing channel feedback may reduce service level variance and/or which ensure reliability of the uplink.

The foregoing channel feedback is may additionally or alternatively be used to schedule transmission to the base station from the subscriber stations. For example, according to embodiments of the invention, a base station may use the CQM information provided in the channel feedback signal transmitted by subscriber stations to determine an uplink map setting forth which subscriber stations are to transmit, perhaps including particulars with respect to subscriber station transmissions, such as may include assigned time slots, data rates (e.g., modulation rates) to use, channels to use, antenna beams to use, etcetera. According to embodiments of the invention, in order to reduce service quality variance, subscriber stations that have better link budget or otherwise indicate a higher channel quality may be scheduled less often and/or when interference is high to facilitate increased bandwidth availability for other subscriber stations.

Moreover, a base station operable according to embodiments of the present invention may broadcast receiving conditions, such as determined through receipt of the foregoing channel feedback, over the control channel to facilitate intelligent control of the subscriber stations. For example, such control channel broadcasts may be utilized to direct subscriber stations to change channels, to change antenna beams (or antenna beam attributes), to increase critical transmission repetitions (e.g., ARQ, channel conditions, etcetera), to reduce transmission data rate, and/or the like to further reduce service level variance and/or ensure reliability of the uplink.

Base stations operable according to embodiments of the invention may schedule transmission bandwidth to provide higher bandwidth to subscriber stations reporting better CQM. For example, data rate adjustment using fixed, predictable feedback according to embodiments of the invention may be utilized to provide improved bandwidth gain. In particular, constant feedback according to embodiments of the invention allows base stations and/or subscriber stations to determine the data rate before any transmission is executed, such that the data rate can be continuously and quickly adjusted to receiving conditions. It should be appreciated that the foregoing technique, wherein appropriate data rates may be selected prior to data transmission, is fundamentally different than traditional techniques, such as conventional closed loop methods (e.g., where data packet loss reports are used to determine whether to increase or decrease the date rate).

Subscriber stations of preferred embodiments use highly directional antennas and thus their received interference incorporates fewer sources with higher power, consequently it is expected that the reported interference will be fluctuating with significant variance with a relatively long duration (correlation length), such as on the order of hundreds of milliseconds, facilitating the use of the aforementioned adjustable data rates. For example, adjusting data rates, perhaps in combination with allocation of slots or channel access, can be utilized for bandwidth allocation. Of course, various additional or alternative bandwidth allocation techniques, such as code rate change, adding channels, etcetera, may be implemented according to embodiments of the invention.

It should be appreciated that the foregoing scheduling techniques provide for N-branch diversity, where N is the number of subscribers to be served at a time. The forgoing diversity is particularly useful in providing scheduling communications to provide an acceptably high mean throughput while reducing variance of the service according to the present invention. Specifically, it is assumed that interference conditions are link or connection related, such that different locations are expected to have different, uncorrelated, interference. Accordingly, at each instant in time there will be a subscriber station of a group of subscriber stations that is experiencing the best carrier to interference (C/I) conditions and consequently can implement the highest data rate as among the group of subscriber stations. By identifying the subscriber station with the best C/I conditions at each instant in time and serving this subscriber station, while waiting for other subscriber stations to experience improvement in their C/I conditions, the total system data rate may be maximized. Accordingly, where there are N subscriber stations to serve, the situation is very similar to N branch diversity. By identifying a subscriber station with sufficient C/I conditions to accommodate desired communications and serving this subscriber station, perhaps while postponing communications with subscriber stations with the best C/I conditions until such time as the "less fortunate" subscriber station's C/I conditions do not accommodate desired communications, system service level variance may be minimized. Accordingly, a minimum level of service may be guaranteed.

Figure 5:
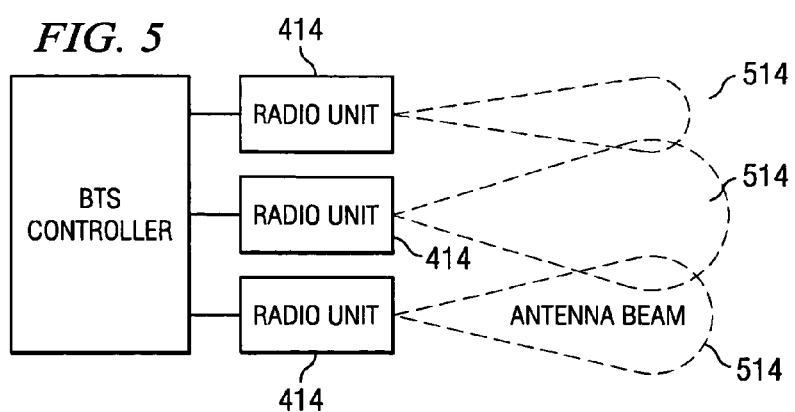
FIG. 5 shows a possible deployment of set of radio units of the communication system of FIG. 4.
Figure 4:
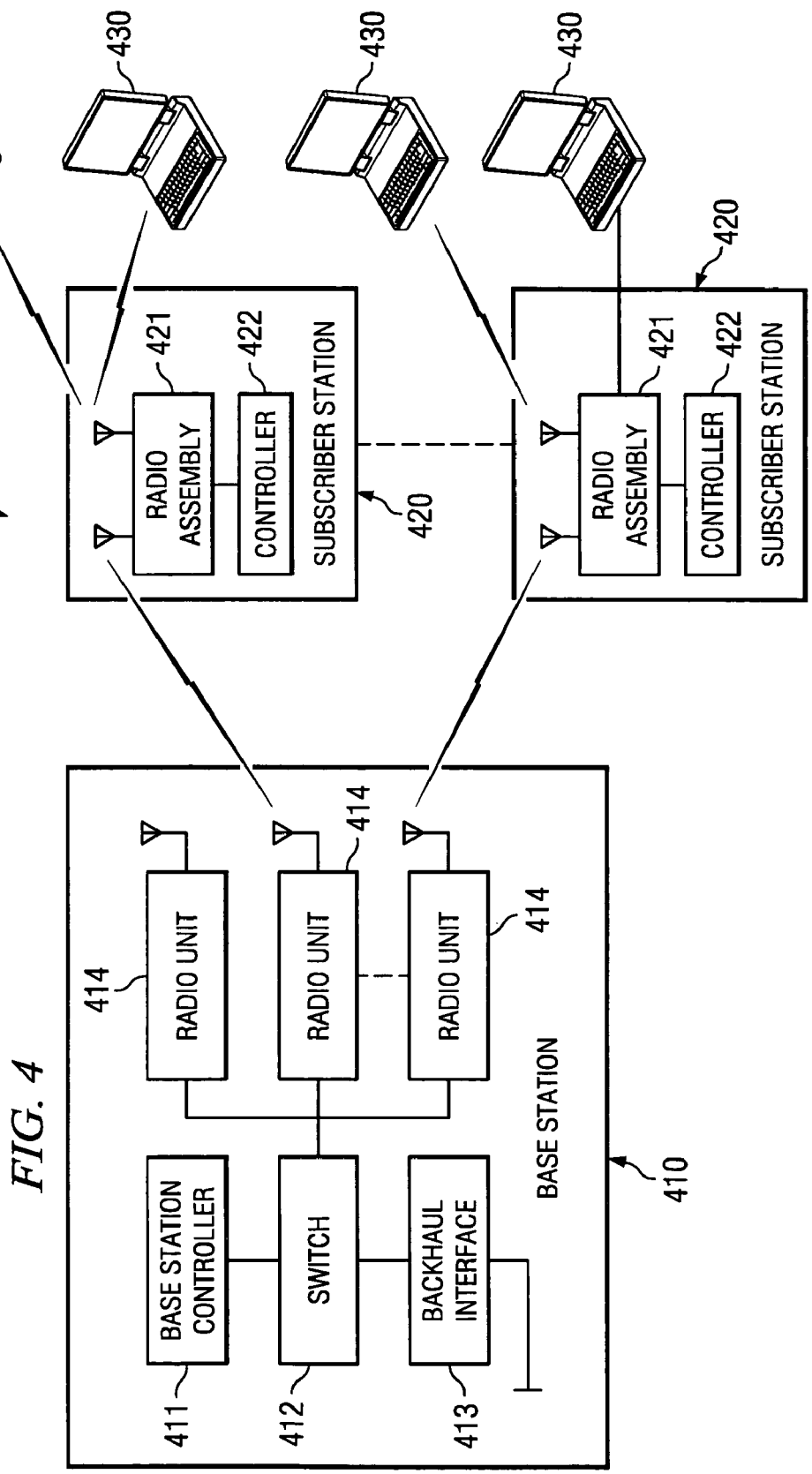
FIG. 4 shows a communication system adapted according to an embodiment of the present invention.
Figure 6:
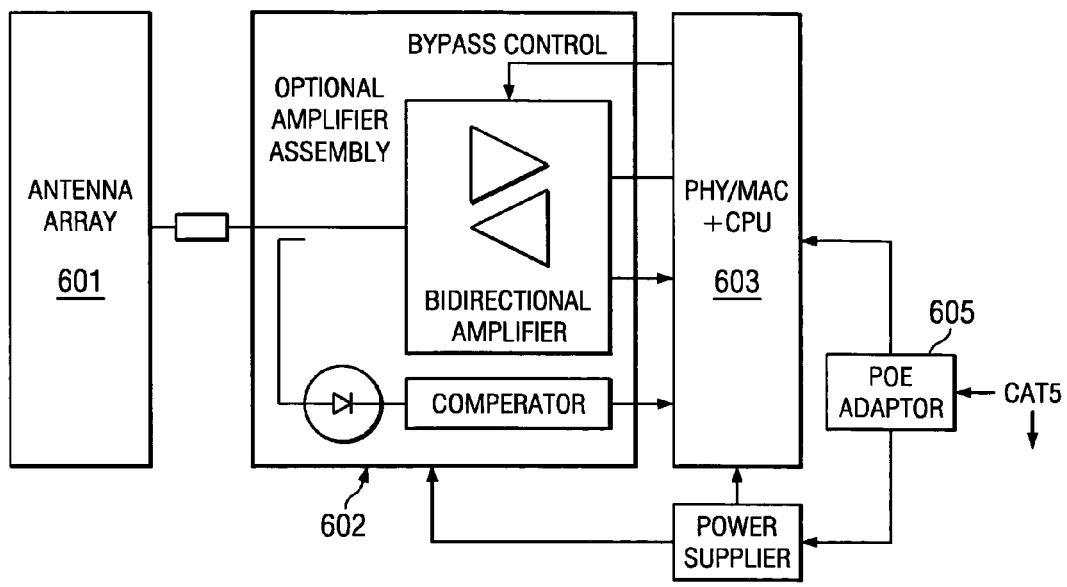
FIG. 6 shows detail with respect to an embodiment of the radio units of FIG. 4.

Having broadly described concepts of the present invention, reference is now made to FIGS. 4-6 wherein an exemplary system configuration adapted to provide operation according to embodiments of the present invention is shown. As shown in FIG. 4, communication system 400 comprises base station 410 and a plurality of subscriber stations 420. According to embodiments of the invention, base station 410 and/or subscriber stations 420 can make use of a significant amount of standardized technology, such as those designed to implement IFEE 802.11 and 802.16 protocols. Accordingly, economics in the deployment of communication system 400 may be realized. However, the foregoing standardized technology is adapted or otherwise coupled to technology which provides a combination operable as described herein.

It should be appreciated that a plurality of subscriber stations 420 may be provided communication links by a single radio unit 414 according to embodiments of the invention. A communication system operable according to embodiments of the present invention may include a plurality of base stations. Moreover, subscriber stations of embodiments of the present invention may be in communication with a plurality of base stations. It should be appreciated that communication equipment in addition to or in the alternative to that illustrated may utilize a communication system adapted according to the present invention, if desired.

The block diagram of FIG. 4 provides a general architecture view of a base station adapted according to the present invention. Base station 410 of the illustrated embodiment comprises controller 411, switch 412, backhaul interface 413, and radio units 414. Controller 411 may control switch 412, backhaul interface 413, and/or one or more of radio units 414 to provide operation as described herein.

Preferably, base station 410 is deployed such that antenna patterns associated with radio units 414 illuminate a service area and subscriber stations employ highly directional antenna pointed at base station 410 to minimize interference probability to their associated connection. For example, antennas associated with radio units 414 may be deployed on a roof or a tower to provide wireless communications within a portion of a metropolitan area. FIG. 5 illustrates a possible deployment of a set of radio units wherein the radio units may provide various different beam widths, directions, and/or frequency channel (e.g., out of a selected set) such that a service area is selectively covered. According to embodiments of the invention, some portions of a service area may be covered with multiple beams (e.g., areas where at least a portion of antenna beams 514 overlap), such as may implement different communication channels to allow for more bandwidth and interference immunity. Sparsely populated portions of a service area are preferably provided coverage by fewer beams, e.g., illuminated by 1 antenna beam of a base station, according to embodiments of the invention. A "starter" base station may include only few radio units, allowing for the addition of more radio units as need arises. Accordingly, it should be appreciated that the number and allocation of radio units is flexible to facilitate variable coverage, bandwidth and interference immunity according to embodiments of the invention.

FIG. 6 provides detail with respect to a preferred embodiment implementation of radio units 414. According to one embodiment, the radio unit circuitry of FIG. 6 is encapsulated within an antenna array housing, e.g., an "out-door unit." Multiple antenna array configurations may be utilized to provide different antenna beam patterns as desired. For example, antenna array 601 may provide antenna beams of 10°, 30° and 90° azimuth beam width, perhaps having approximately 15° elevation beam height. The embodiment illustrated in FIG. 6 provides optional amplifier assembly 602, such as may be used to boost transmission power as desired and/or improve receiving noise figure. PHY/MAC/CPU unit 603 of the illustrated embodiment incorporates an orthogonal frequency division multiplex (OFDM) modulator/demodulator, error correction and basic transmit/receive access mechanism. Media access control software may be implemented on the CPU of PHY/MAC/CPU unit 603.

It is expected that antenna arrays 601 of base station 420 may be deployed in high locations to provide illumination of a service area, and thus expose the base station's receiver to a larger amount of interference. Using highly directional antennas oriented at the base station can provide for statistical advantage for the subscriber station signals over the interference (that is generated at random antenna orientations).

Radio units 414 may be coupled to other functional blocks of base station 410, such as switch 412 and/or controller 411, via wireline links such as standard category 5 (CAT5) cables, using interface 605. Base station 410 (FIG. 4) of the illustrated embodiment provides backhaul of information via backhaul interference 413, such as may provide high bandwidth communication (e.g., using fiber optic, T1, T3, and/or similar links).

Switch 412 preferably arbitrates communications between radio units 414, between radio units 414 and controller 411, and between radio units 414 and backhaul interface 413. For example, transmission of control channel information by controller 411 may be directed to appropriate ones of radio units 414 for broadcast. Likewise, reception of feedback channel information from subscriber stations 420 may be directed to controller 411 by switch 412. Communication of information by and between any of controller 411, backhaul interface 413, and radio units 414 may be controlled by switch 412.

Controller 411 of an embodiment provides a processor having memory associated therewith for storing an instruction set providing operation as described herein. In operation according to a preferred embodiment, controller 411 provides analysis of communications information (e.g., data queues, historical bandwidth utilization, time since last transmission to/from particular subscriber stations, channel quality metrics, etcetera) to determine which subscriber stations to instruct, such as via a control channel communication, to provide a channel feedback signal. Additionally, controller 411 of a preferred embodiment utilizes subscriber station feedback signals in scheduling uplink and downlink communications, as described in detail herein, to provide a relatively low service quality variation, provide a highly reliable uplink and/or downlink, and/or to provide desired throughput with respect to the downlink and/or uplink. According to preferred embodiments, controller 411 executes space-time scheduling and channel selection techniques, such as shown and described in the above referenced patent applications entitled "Space-Time-Power Scheduling for Wireless Networks" and "System and Method for Interference Mitigation for Wireless Communication," to provide a basis for high throughput communications. Additionally, controller 411 may provide control of subscriber station association, security, etcetera. Embodiments of controller 411 may provide for initialization of radio units 414, parameter setting, and/or other initialization or operational controls.

According to embodiments of the invention, radio units 414 provide broadband wireless access to a plurality of subscriber stations 420. Synchronous protocols are preferably implemented with respect to the wireless links between base station 410 and subscriber stations 420 to facilitate channel quality measurement and/or scheduling according to embodiments of the invention. For example, wireless links between base station 410 and subscriber stations 420 may implement communications according to the IEEE 802.16 specifications.

Subscriber stations 420 may terminate the link at the customer premises or can be located at central location to allow multiple subscriber stations to access the network. Subscriber stations 420 of the illustrated embodiment comprise customer premises equipment (CPE) which are deployed in a service area around base station 410 where sufficient link budget exists. Subscriber stations 420 of a preferred embodiment can serve subscriber terminals 430 (e.g., personal computers (PCs), personal digital assistants (PDAs), cellular telephones, pagers, etcetera) through wireline and/or wireless connections. Communications between subscriber stations 420 and subscriber terminals 430 may be provided using different protocols than those between subscriber stations 420 and base station 410. For example, wireless links may be provided between subscriber stations 420 and subscriber terminals 430 according to the IEEE 802.11 specifications (WiFi) while wireless links between subscriber stations 420 and base station 410 may be provided using the IEEE 802.16 specifications.

As with base station 410 discussed above, FIG. 4 provides a general architecture view of subscriber stations adapted according to the present invention. Subscriber stations 420 of the illustrated embodiment comprises radio assembly 421 and controller 422. Controller 422 may control one or more radios of a corresponding radio assembly 421. Controller 422 of an embodiment provides a process of having memory associated therewith for storing an instruction set providing operation as described herein.

Figure 7:
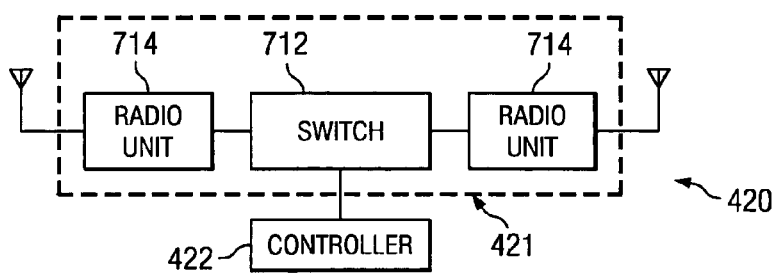
FIG. 7 shows detail with respect to an embodiment of the subscriber stations of FIG. 4.

Directing attention to FIG. 7 further detail with respect to an embodiment of subscriber station 420 configured according to an embodiment of the invention is shown. In the embodiment of FIG. 7, radio assembly 421 comprises a plurality of radio units 714 in communication via switch 712. Radio units 714 may comprise circuitry such as that described above with respect to radio units 414 and as shown in FIG. 6. However, radio units 714 of a preferred embodiment radio assembly 421 are configured to provide operation according to different protocols. For example, PHY/MAC/CPU 603 of a first radio unit 714 of a radio assembly 421 which provides a wireless link to base station 410 may provide operation according to a first protocol (perhaps including particular channels), such as IEEE 802.16, while a PHY/MAC/CPU 603 of a second radio unit 714 of the radio assembly which provides a wireless link to subscriber terminals 430 may provide operation according to a second protocol (perhaps including different particular channels). Additionally or alternatively, antenna arrays 601 of each such radio unit 714 may provide different antenna patterns, as appropriate. For example, an antenna array 601 which provides a wireless link to base station 410 may provide highly directional antenna beams, whereas an antenna array 601 which provides a wireless link to subscriber terminals 430 may provide broad, even omni-directional, antenna beams.

Switch 712 preferably arbitrates communications between radio units 714 and between radio units 714 and controller 422. For example, transmission of channel quality feedback information by controller 422 may be directed to appropriate ones of radio units 714 for communication to base station 410. Likewise, reception of control channel information from base station 410 may be directed to controller 422 by switch 412. Communication of information by and between any of controller 422 and radio units 714 may be controlled by switch 712.

It should be appreciated that the foregoing systems provide a number of degrees of freedom with respect to scheduling communications. For example, as discussed in more detail in the above referenced patent application entitled "System and Method for Interference Mitigation for Wireless Communication," a base station as described above may use multiple receivers operating on a same channel with antennas separated and even differently oriented to provide for interference diversity. Additionally, subscriber stations as described above may transmit feedback on alternate channels to enhance feedback robustness.

Increasing the number of different beams covering a portion of the service area (e.g., sector) at the base station provides for both channel diversity and spatial diversity. For example, RF heads, such as those of radio units 414, can be deployed at spatially different locations on the roof or tower supporting the base station to provide increased spatial diversity. RF routing (as shown in the above identified patent application entitled "System and Method for Interference Mitigation for Wireless Communication") can be utilized to optimize channel and/or antenna beam assignments to achieve the best performance, such as by continuously measuring subscriber stations' received signal strength indicator (RSSI) and using this information to determine which subscriber stations can be simultaneously served on the same channel.

Uplink data transmission is resolved at base station controller 411 according to embodiments of the invention to optimize use of the available degrees of freedom in scheduling communications with respect to a plurality of subscriber stations. For example, assuming signal and interference reception conditions vary from antenna beam to antenna beam, frame selection may be performed centrally at the base station. It should be appreciated that uplink data transmission scheduling provided by base station controller 411 need not be restricted to communications associated with a single base station. For example, where subscriber station transmissions are received by multiple base stations (presumably with signal and interference reception conditions varying from antenna beam to antenna beam and base station to base station), base station controller 411 of an embodiment performs frame selection centrally with respect to a plurality of base stations.

Communication system 400 may operate so that ones of subscriber stations 420 that have high probability of being served (e.g., subscriber stations which have a high probability of a transmitted signal being received over interference levels) generate continuous feedback related to channel conditions (interference, signal strength) to base station 410. However, this feedback may consume substantial uplink bandwidth, particularly where the number of subscriber stations that have "high probability of being served" is large. To avoid excessive uplink bandwidth loss according to preferred embodiments of the invention, controller 411 of base station 410 may generate a downlink map to identify a particular subset of subscriber stations of those having a high probability of being served for transmitting feedback. For example, controller 411 may look to transmit queues available to base station 410 to determine those subscriber stations currently in most need of communication services, to time information with respect to a last transmission to or reception from subscriber stations stored at base station 410 to determine those subscriber stations which may require communication services, and/or the like to determine subscriber stations in need of communication services. It should be appreciated that the foregoing subset of subscriber stations need not be limited to those most likely in need of communication services, if desired. For example, such a subset of subscriber stations may comprise one or more subscriber stations included for "opportunity fairness" reasons (e.g., each subscriber station may be included periodically in the list irrespective of communication services need), in addition to the subscriber stations determined to be most likely in need of communication services.

Base station 410 may advertise the foregoing subset of subscriber stations (e.g., broadcast a list of subscriber stations on a control channel). These subscriber stations may then respond with channel quality measurement information in the form of an uplink feedback signal. Appropriate coding can minimize the feedback information, such that multiple subscriber stations may provide reports quite frequently.

It should be appreciated that, according to preferred embodiments, the particular identified subscriber stations are able to provide the aforementioned channel quality measurement information substantially instantaneously due to their continuous monitoring of the downlink. For example, according one embodiment subscriber stations 420 monitor a continuous (it being understood that continuous as used herein includes a repeated periodic signal, such as associated with a time division protocol) control channel to monitor link conditions in real time, even when the subscriber station is not transmitting or receiving payload data.

The feedback signals may be used by base station 410 in scheduling uplink and/or downlink communications between base station 410 and selected ones of subscriber stations 420. For example, base station 410 may use transmission of the channel feedback by subscriber stations 420 to estimate the instantaneous interference level associated with an uplink channel between the subscriber station at the base station. Additionally, the channel quality measurement information contained within the feedback signal may be used by base station 410 to determine an interference level associated with a downlink channel between the base station and subscriber station.

Scheduling of subscriber station to base station transmission and/or base station to subscriber station transmission according to embodiments of the invention is not based exclusively on a channel quality estimate level. For example, although at least some minimal level of channel quality may be desired in order to ensure that scheduled communications have a reasonable probability of reception by the intended target, scheduling according to preferred embodiments may not be based upon a subscriber station having a highest channel quality estimate associated therewith. Accordingly, although a maximum possible bandwidth throughput may not be achieved, embodiments of the invention provide scheduling priority to subscriber stations having lower channel quality estimates associated therewith, in order to achieve uniformity with respect to service levels experienced by the subscriber stations. However, a preferred embodiment of base station 410 schedules transmission bandwidth such that subscriber stations of subscriber stations 420 reporting better channel quality estimates which are scheduled for communications are to get higher bandwidth.

In order to better understand the foregoing, assume base station 410 provides service to N subscriber stations. The subscriber stations experience independent burst of interference, as may be represented by the following parameters:

Ti=interference duration;

T=average duration from burst to burst (e.g., start to start);

Ti/T=average duty cycle of bursts; and

Td=interference detection time (e.g., the time between the beginnings of an interference burst to the time at which the base station is aware that an interference burst has occurred).

Assume for an embodiment described above that Ti is in the range of approximately 10-300 msec, Ti/T is in the range of approximately 0.5 to 0.9, and Td is in the range of approximately 10-30 msec. For any given subscriber station the probability (p) of interference at any given time may be represented as:

$$p = Ti/T.$$

If the base station was able to anticipate when an interference burst occurs, it would be able to transmit to a non-interfered subscriber station, the only exception being when all of the subscriber stations experience interference bursts at the same time. However, the probability of all subscriber stations experiencing interference bursts at the same time is $p^N$. Thus, the throughput efficiency (probability for successful transmission to at least one subscriber station) may be represented as $1-p^N$.

In this example, it takes Td seconds before the base station detects the presence of interference. Accordingly, packet errors may occur with probability Td/T=Td/Ti*Ti/T=Td/Ti*p. Therefore, the overall throughput efficiency may be represented by the following:

$$Throughput\_efficiency = 1 - p^N - p \cdot Td/Ti$$

It should be appreciated that, when the number of subscriber stations is large, $p^N$ becomes negligible. Accordingly, where a large number of subscriber stations (e.g., more than 10) are present, the above equation for throughput efficiency may be simplified as follows:

$$Throughput\_efficiency = 1 - p \cdot Td/Ti$$

In contrast to the throughput efficiency which may be achieved without using a scheduling technique of the present invention, e.g., a base station randomly chooses subscriber stations to transmit to, will experience a packet error rate p. Accordingly, the throughput efficiency of such a "random" transmission system may be represented as:

$$Throughput\_efficiency = 1 - p$$

To compare the throughput efficiency of a system such as communication system 400 implementing scheduling according to an embodiment of the present invention with that of a communication system implementing random transmission, let Td/Ti=0.1 and p=0.5, 0.6, 0.7, 0.8, and 0.9. For the random transmission system, throughput efficiency=0.5, 0.4, 0.3, 0.2, and 0.1 for respective ones of the forgoing values of p. However, for a system implementing interference based scheduling according to the present invention, throughput efficiency=0.95, 0.94, 0.93, 0.92, and 0.91 for respective ones of the forgoing values of p.

Embodiments of the present invention provide for data rate adjustment, such as to provide data rates which correspond to channel quality as detected by subscriber stations and/or the base station. For example, embodiments of the present invention may utilize real time channel quality measurements to determine a data rate which is appropriate for use with respect to the instantaneous interference present in the channel.

Data rates have been adjusted in the past based on frame drop rate feedback, such as where a transmitter monitors the rate of dropped frames (e.g., based on ARQ reports). For example, when a dropped frame rate is below certain target value, the transmitter may increase the data rate and visa versa for dropped frame rates that are above this value. The targeted frame drop rate is generally quite low (e.g., less than 10%). Accordingly, a transmitter may use a substantial amount of time to determine the dropped frame rate (e.g., tens of frames for statistically sufficient sample). When multiple subscriber stations (N) are being served, the time for determining the dropped frame rate is increased by factor of N. In addition, many ARQ based protocols implement a re-transmit "timer" value, such as to provision the time for round trip delay between sending the frame and its associated ACK, must be set to be as large as possible. Such a re-transmit timer value adds to the delay between the frame dropping events and the associated reports. Consequently the transmitter reaction to an increase or decrease in frame drop rate is often relatively slow. The foregoing is aggravated when a subscriber station's link budget is highly variable, such as may result from variable distance and shadowing. Accordingly, in operation according to such prior attempts at providing adjustable data rates, when a channel is clear of interference the system takes advantage of good link budgets (serving with higher data rate) such that even subscriber stations that have relatively good reception (signal to noise ratio) are being served with much lower data rate that their link budget allows. Moreover, when a channel is frequently interrupted by interfering signals with a substantial duty cycle, the transmitter is most likely unable to track the frame drop rate changes and the resulting operation will be to adjust the data rate to the minimum possible.

To illustrate the foregoing, note that the number of packet errors has a binomial distribution with mean M*p and variance M*p*(1−p), where M is the number of trials (e.g., the number of packets). To ensure that the desired packet error rate p is achieved, the number of trials should be sufficiently large so that the standard deviation will be small compared to the mean. Assuming that a standard deviation of half the mean number of trials is acceptable, the number of trials may be represented as:

$$M=4(1-p)/p$$

Assuming that a communication system serves N subscriber stations in a round robin fashion, it will take MN packets before the packet error rate can be reliably determined.

Denote the convergence time of the rate adjustment algorithm as Tc. From the above, the time of the rate adjustment may be represented as:

$$Tc>Tp*N*4(1-p)/p$$

Where Tp is the packet transmission time. The rate adjustment algorithm is effective if Tc<<Ti, otherwise the rate adjustment algorithm does not keep up with the rate of change of the interference. Where the target packet error rate p is sufficiently small, such as on the order of 10%, the algorithm can only converge by adjusting the rate to its lowest value or by stopping transmission altogether because the target error rate can not be met. Accordingly, the average data rate (avgR) becomes the lowest data rate possible.

It should be appreciated that in an adjustable data rate communication system, the total throughput will depend on the data rate used during the times when the transmissions are successful. Accordingly, total throughput may be calculated as follows:

$$Throughput=Throughput\_efficiency*avgR$$

For example, a channel with 50% blockage by interference achieves 3 Mb/s throughput (effective data rate).

In communication system 400, implementing interference based scheduling of the present invention, subscriber stations provide feedback as discussed above which may be used to determine the transmission data rate to be implemented. Accordingly, transmitters of embodiments of the present invention can adjust the data rate more accurately, thereby providing higher average data rate transmission.

As discussed above, feedback signals implemented according to embodiments of the present invention consume uplink bandwidth. Accordingly, the feedback message is preferably kept as short as possible. To improve the robustness of the feedback message, redundant information and/or special coding may be implemented according to embodiments. For example, Hadamard coding may be utilized where the detection uses Hadamard transform (see e.g., IS-95).

Using fast feedback according to embodiments of the invention, communication system 400 is able to adjust the data rate for each frame transmission, such as according to the carrier to interference (C/I) level at the intended subscriber station. This leads to the largest possible average data rate (avgR) which can be achieved when subscriber station received signal to noise ratio is high (good link budget).

To better understand the foregoing, assume that for a given deployment of communication system 400 the link budget allows a mean data rate of 12 Mb/s (some subscriber stations are able to receive higher data rate and some lower). With 90% throughput efficiency the system throughput may be determined to be 12*0.9=10.8 Mb/s. Taking 80% of this calculated throughput (to account for the 20% "cost" of the feedback signals), the exemplary embodiment achieves 8.64 Mb/s throughput. It should be appreciated that the throughput achieved in this exemplary embodiment is approximately three times higher than that of a more traditional system implementing packet error rate estimation. Moreover, when the expected link budget improves, the performance gain associated with the exemplary embodiment also improves.

The performance of the exemplary communication system improves linearly with the link budget, while the more traditional packet error rate estimation system's performance is severely bounded by interference and will not improve as link budget improves. Specifically, as shown above, the transmission data rate in conventional approach will very likely revert to the minimum data rate possible. If system is able to track the C/I+N, the data rate when no interference presence will track the C/N. When the C/N improves, the average data rate achieved by the exemplary embodiment of the present invention will be higher as well.

In developing the present invention it was realized that, although an uplink may carry smaller load than a corresponding downlink (e.g., Internet applications or client server applications where relatively small queries and responses are provided in the uplink and data files and documents are provided in the downlink), uplink reliability may critically effect downlink operation. Specifically, in downlink dominant transmission the ACK signaling provided in the uplink may be very critical. For example, a frame of 1000 bytes can be voided if a few bytes of layer II ACK are not successfully provided in the uplink. However, even where highly directional antennas are utilized at base station 410 as discussed above, where the interference is originating from same area where a subscriber station is located, the probability of errors at the base station may be substantial. Accordingly, signaling (in the uplink and/or downlink) that is considered critical to system performance or operation or otherwise important may be transmitted using a low data rate, or another technique for optimizing the chances of successful transmission (e.g., repetitions, coding, etcetera), according to embodiments of the present invention.

An uplink scheduling strategy implemented by communication system 400 according one embodiment reduces the service level variability, even to the point of the average service level being sacrificed, in order to provide highly reliable uplink communications. The probability density function of FIG. 2B, discussed above, illustrates reduction of service level variability providing a slightly reduced average service level. An aim of operation according to this embodiment is to reduce variability by adequate scheduling, such as by using techniques described below. If variability is reduced, even at the expense of the mean, outages can be substantially reduced, as shown in FIG. 2B.

In providing uplink scheduling according to embodiments of the invention, base station 410 directly measures interference signal level and time density (channel occupancy) by estimated incoming subscriber station signal RSSI, e.g., the above mentioned continuous subscriber station feedback signals, and time intervals between the incoming signal frames. Knowing the interference levels, base station 410 can select particular ones of subscriber stations 420 that are being received with sufficient signal level to overcome the current interference (preferably leaving subscriber stations received with higher signal levels for scheduling during higher level interference). Transmitting "critical" uplink signals using a minimum data rate increases the probability of always finding a "candidate" subscriber station that suffices with respect to the above condition. This can be rapidly done through the use of an uplink map.

According to embodiments, uplink power control may be very minimal (e.g., just enough to avoid inter-channel interference due to insufficient adjacent channel isolation). Additionally or alternatively, systems operable according to embodiments of the invention may use non-adjacent channels (as is very possible at the 5.8 Ghz unlicensed spectrum) where more channel-to-channel isolation is possible. Subscriber stations may also be controlled to alternate between different channels to increase the transmission reliability (interference immunity). Additional or alternative techniques for improving the probability that critical or otherwise important uplink transmissions are received by base station 410 may include transmission of multiple identical symbols or bursts such that receiver can increase its decision reliability, as shown in the above referenced patent application entitled "System and Method for Interference Mitigation for Wireless Communication."

In order to better understand the foregoing, assume that the probability density function (PDF) of the interference-plus-noise at the base station's receiver input is known. The PDF of the interference-plus-noise may be given by a set of power levels and the associated probabilities $\{I(m), P_{I(m)}, m=1, \ldots, M\}$. The probabilities $P_{I(m)}$ can be thought of as the fraction-of-time during which the interference plus noise has a level of I(m). There are Nu subscriber stations 420 served by base station 410, and the PDF of the signal strength at which they are received is known. The PDF of the signal strength may be given by a set of power levels and their associated probabilities $\{S(n), P_{S(n)}, n=1, \ldots, N\}$. These probabilities represent the fraction of subscriber stations $P_{S(n)}$ in a group of subscriber stations whose signal strength is $S(n)$. The number of subscriber stations in the n-th group is $P_{S(n)}*Nu$.

For each interference plus noise and signal level, the associated SINR may be calculated as follows:

$SINR(m,n)=S(n)/I(m)$

Figure 8:
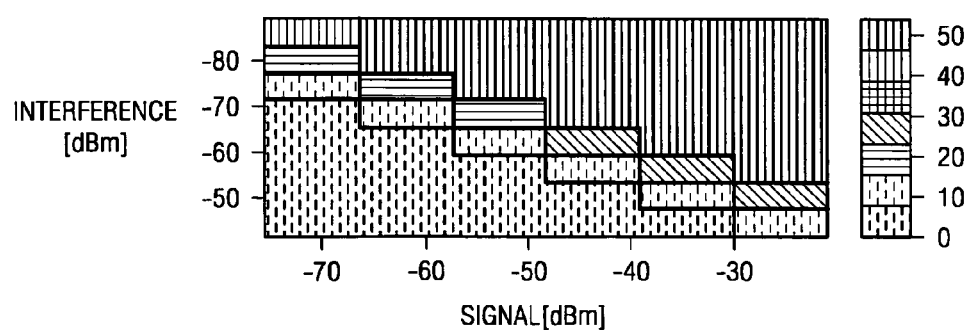
FIG. 8 shows a data rate matrix representative of variable data rates provided by an embodiment of the present invention.

From the above, the corresponding data rate, r(m,n), which can be used for that particular combination of interference and subscriber station can be determined. The case where no transmission is possible will correspond to a zero rate. These data rates can be collected into an N×M rate matrix R, such as that shown in FIG. 8.

Figure 9:
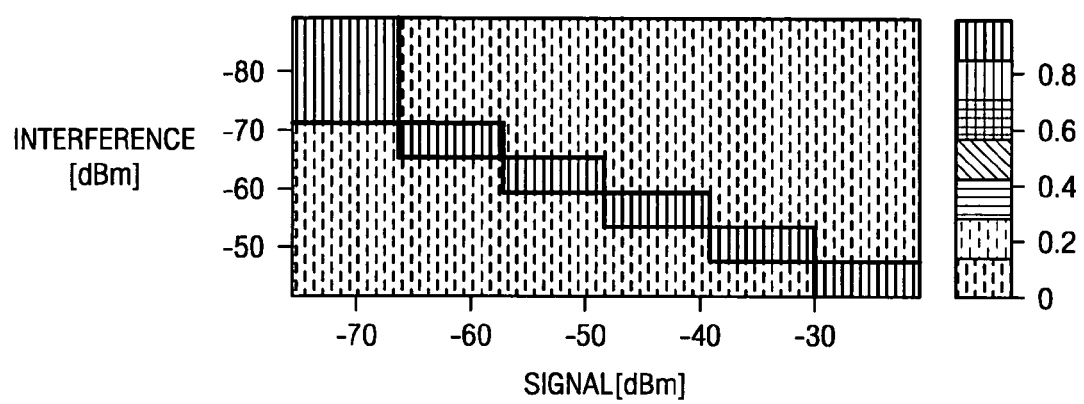
FIG. 9 shows probability matrix representative of service probabilities provided according to an embodiment of the present invention.

For each interference level base station 410 may serve subscriber stations 420 according to a pre-determined set of probabilities $\{P(m,n)\}$, where P{m, n} denotes the fraction of time during which subscriber stations in group n are being served when the interference level is I(m). These probabilities can be collected into an N×M matrix P, such as that shown in FIG. 9 wherein each row of the matrix adds up to unity.

The average throughput of the system, i.e. the average data rate flowing through the base station may be given by the following:

$$Ravg = \sum_m \sum_n P_{I(m)} r(m,n) P(m,n)$$

Correspondingly, the average throughput, or average data rate, for each subscriber station may be given by the following:

$$Ravg(n) = \frac{\sum_m P_{I(m)} r(m,n) p(m,n)}{P_{S(m)} Nu}$$

In order to provide a similar level of service to each subscriber station, preferred embodiments of the invention deliver more or less the same data rate to each subscriber station. A reasonable measure of fairness is the ratio of the highest to lowest average data rate, as follows:

$$F = \frac{\max\_n(Ravg(n))}{\min\_n(Ravg(n))}$$

It may be desirable according to embodiments to provide a scheduler to determine the set of probabilities P(m,n) so as to maximize the system throughput Ravg for a given fairness level. However, this is difficult to do directly. Accordingly, embodiments of the invention utilize the following optimization:

Let $$Rwavg = \sum_m \sum_n P_{I(m)} r(m,n) P(m,n) W(n)$$

be a weighted average of the system throughput where subscriber stations in different groups are given different weights w(n). If all subscriber station groups get the same weights, then maximizing Rwavg leads to the optimal throughput while ignoring any notion of fairness. By giving more weight to a given subscriber station group, the scheduler will tend to increase the service to that group. Accordingly, by giving larger weights to the weaker signals the fairness measure can be improved compared to the equal weight case. Where a scheduler, such as may be operable within controller 411 of base station 410, arranges the signal levels by ascending order from n=1 to n=N, the foregoing weights may be chosen as follows:

$W(n)=\alpha^{n-1}$

Where $0<\alpha<=1$. By choosing different values of alpha, different choices of the weights may be obtained.

The optimization may now be formulated as: Maximize Rwavg over all possible choices of P(m,n), subject to the constraints $P(m,n)>=0$, $P(m,n)<=1$, and $\Sigma P(m,n)=1$ for n=1, ..., N. Because the cost function is linear in the variables P(m,n), the foregoing can be solved by a linear programming algorithm, which is readily implemented in controller logic such as that of controller 411.

Figure 10:
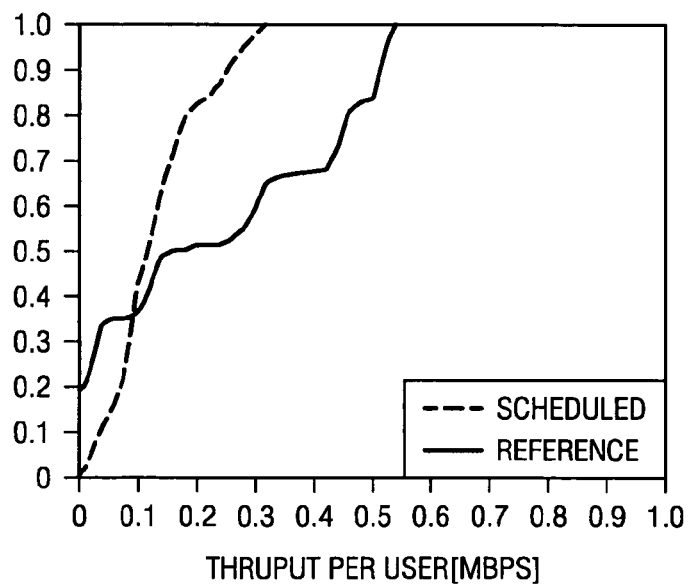
FIG. 10 shows a cumulative density function illustrating the effect of changing selection weighting coefficients both in scheduled and unscheduled communication systems.

An example of a throughput cumulative density function (CDF) is presented in FIG. 10. As can be seen by the curves of FIG. 10, the effect of experimenting with the α coefficients without scheduling (the curve labeled "ref") results in service outage (for the purposes of FIG. 10, less than 100 Kb/s) more than with scheduling (the curve labeled "scheduled"). Accordingly, it can be seen that scheduling according to embodiments of the invention can eliminate potential outage by reducing the throughput variance.

An alternative approach to uplink scheduling which may be implemented according to embodiments of the invention may give all subscriber station groups the same weights, but try and minimize the variance of Ravg(n). Minimizing the variance of Ravg(n) will minimize the variability of the transmission rates to different subscriber stations. In this case the following optimization may be utilized:

Minimize over all possible choices of P(m,n)

$$VAR = \sum_n (Ravg(n) - mu)^2$$

Where $$mu = \frac{1}{N} \sum_n Ravg(n)$$

and P(m,n)>=0, P(m,n)<=1, and ΣP(m,n)=1 for n=1, . . . , N. In this case the cost function is a quadratic function of P(m,n), so this can be solved by a quadratic programming algorithm as may be implemented in controller 411 of base station 410.

Having described uplink scheduling, downlink scheduling according to embodiments of the present invention will be described. An aim of downlink interference based scheduling according to embodiments of the invention is to maximize the system throughput while guaranteeing minimum level of service to all subscriber stations. If the scheduler executes multiuser diversity as mentioned above, some subscriber stations that happen to be "unfortunate" as a result of low signal level or excessive interference may not get the minimum service level (e.g., they may be in outage). To prevent this, communication system 400 of a preferred embodiment operates to ensure that these subscriber stations are served despite their "unfortunate" situation.

In explanation of the foregoing downlink scheduling concepts, assume that there are several subscriber stations 420 that are being served by base station 410. Each subscriber station's associated data stream may be arranged in a queue so that base station 410 is trying to "push" multiple queues as quickly as possible while making sure that even the worst link subscriber station will be adequately served. In operation according to an embodiment, at each instance base station 410 observes the quality feedback from the subscriber stations, as described above. Base station 410 may selects the subscriber station having the best channel quality measurement for service in order to maximize system throughput. If all subscriber station's channel quality values have the same statistics, all queues will be moved equally. However, when some of the subscriber stations are experiencing a lower quality channel (e.g., lower signal level, higher interference level, and/or the like) theses subscriber stations may not be selected/served, and consequently their queues will grow.

Downlink scheduling according to embodiments of the present invention provides for controller 411 of base station 410 monitoring the queue sizes and changes the probability by which subscriber stations are selected for service. For example, the selection process may "prefer" the "unfortunate" subscriber stations over the more "fortunate" ones. In this case, much like the uplink scheduling technique discussed above, lower quality channel subscriber stations may be artificially provided more service than a pure "best out of" technique dictates.

For example, assume communication system 400 comprises N subscriber stations 420, each adapted to operate using a set of nr different rates (including rate of zero). Let $P_{\{i,j\}}$ be the probability that subscriber station number j will operate at rate number i. As discussed above, it is assumed that the interference environments of different subscriber stations are independent and therefore the rates of different subscriber stations may be considered independent random variables. In this example, there are $M=nr^N$ different combinations of the rates of the various subscriber stations. A table may be constructed which contains each of the foregoing combinations of rates. In the exemplary table, let $r_{i(m)}$ denote the rate of subscriber station number i in the m-th row of the table. In other words, $\{r_{1(m)}, r_{2(m)}, \ldots, r_{N(m)}\}$ is the m-th combination of rates. The probability of this combination occurring, p(n), is the product of the probabilities of subscriber station number 1 having rate $r_{1(m)}$, subscriber station number 2 having rate $r_{2(m)}$ and so on. These probabilities are specified by $P_{\{i,j\}}$.

Operation of the present invention preferably decides how many time slots to allocate to the different subscriber stations under different interference conditions to provide substantially uniform service levels among the subscriber stations. First consider the case where the interference conditions are unknown and therefore a fixed number of slots may be allocated to each subscriber station. Let $s_i$ be the number of slots allocated to subscriber station number i. Then subscriber station number i will experience an average throughput of:

$$t_i = \sum_m s_i r_{i(m)} p(m)$$

Accordingly, the total system throughput in this example will be:

$$t = \sum_i \sum_m s_i r_{i(m)} p(m)$$

The foregoing average throughput per user, $t_i$, and the total throughput, t, may be used as reference values for improvements achieved using scheduling techniques as described above.

Now consider a case where the interference conditions at each subscriber station, or equivalently the rate combination m which exists at this time, is known and scheduling according to an embodiment of the present invention is implemented. Under these conditions a scheduler of the present invention may assign $s_{i(m)}$ slots to subscriber station number m. Assuming that both the reference system and the scheduling system use the same number of slots, $s_{total}$:

$$\sum_i s_i = s_{total}$$

$$\sum_i s_{i(m)} = s_{total} \text{ for all } m$$

The average throughput per subscriber station with scheduling may be given by:

$$T_i = \sum_m r_{i(m)} s_{i(m)} p(m)$$

The total average throughput is given by:

$$T = \sum_i T_i = \sum_i \sum_m r_{i(m)} s_{i(m)} p(m)$$

Operation of a scheduler according to preferred embodiments of the invention maximize the total average throughput $$T = \sum_i \sum_m r_{i(m)} s_{i(m)} p(m)$$

over all possible selections of slot allocations $s_{i(m)}$, subject to the constraints $$\sum_i s_{i(m)} = s_{total}$$

for all m. A fixed number of available slots $$\sum_m r_{i(m)} s_{i(m)} r(m) >= t_i.$$

Accordingly, the average throughput per subscriber station is greater than in the reference system It should be appreciated that changes in selection probability with respect to the subscriber stations for downlink and/or uplink communication may be provided for in a number of different ways. For example, statistical distribution, historical analysis, prognostic algorithms, etcetera may be utilized according to embodiments of the present invention. Moreover, combinations of the foregoing and/or other selection probability changing techniques may be implemented, if desired. For example, one or more of the foregoing may be combined with a quasi-random or fairness model selection probability change technique in order to ensure that all subscriber stations are provided scheduling opportunities.

As previously mentioned, a control channel preferably carries uplink and downlink maps to implement scheduling as described herein. For example, an uplink map may be utilized to inform each subscriber station in the network of its allocated uplink slots (if any). In operation according to preferred embodiments of the present invention, unlike normal 802.16 protocols, subscriber stations always transmit at the allocated slot in order to provide the aforementioned feedback message. If the subscriber station has data to be transmitted in the allocated slot, a channel condition/possible data rate message may be attached to the data. However, if the subscriber station does not have data to be transmitted in the allocated slot, a channel condition/data rate possible message is preferably sent in the allocated slot. Additionally or alternatively, systems of the present invention may operate to identify particular subscriber stations in the uplink map which are to transmit channel quality feedback continuously (e.g., until a stop instruction is issued).

An alternative approach to scheduling of feedback messages may utilize a downlink map which announces which subscriber stations are to be served. According to such an embodiment, the subscriber stations identified in the downlink may commence feedback transmission, such as based on an uplink map, until removed from the downlink map. Although this approach may not be highly deterministic, subscriber stations with sufficiently high probability to be served will be included.

Embodiments of the present invention may implement one or more of several approaches to estimate the recommended downlink data rate using the base station generated control channel. For example, subscriber stations may measure control channel RSSI, measure average RSSI when control channel or data section of the TDD frame is inactive, and/or calculate the ratio between the two values to derive a C/I estimate. Additionally or alternatively, using a matched filter (cross-correlation) on control channel frame may provide a correlation coefficient for C/I estimation. Each subscriber station may count the number of successfully received control channel frames within given interval. Since the number of control channel frames for given interval is fixed, m control channel frames reception out of n transmitted can be used to determine channel activity.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for enhancing wireless communications, said method comprising:

measuring, in real-time, interference metrics associated with links between a wireless communication node and a plurality of client nodes, wherein said measuring interference metrics includes determining a probability density function indicating interference plus noise during a fraction of time; and real-time scheduling, based on said interference metrics, communications between said wireless communication node and said plurality of client nodes to reduce service level variability among said plurality of client nodes;

wherein the wireless communication node performs the real-time scheduling on behalf of the client nodes, and wherein wireless communications between a pair of client nodes transit through the communication node.

2. The method of claim 1, wherein a channel set of a plurality of frequency channels are available for use in a plurality of adjacent service area portions.

3. The method of claims 2, wherein said adjacent service area portions comprise sectors of said wireless communication node.

4. The method of claim 2, wherein said adjacent service area portions comprise radiation patterns of a plurality of wireless communication nodes, said plurality of wireless communication nodes including said wireless communication node.

5. The method of claim 4, wherein each wireless communication node of said plurality of wireless communication nodes, schedules transmission independently such that transmissions occur in a channel used by wireless communication node only a fraction of the time and are randomly uniformly distributed over time.

6. The method of claim 1, wherein said real-time scheduling communications reserves selection of client nodes having low interference associated therewith, as determined from said interference metrics, until other client nodes having higher interference associated therewith, as determined from said interference metrics, have been scheduled or are determined to have sufficiently high interference associated therewith that communication is undesirable.

7. The method of claim 1, wherein said measuring interference metrics includes:
said plurality of client nodes continuously monitoring control channel transmission.

8. The method of claim 1, wherein said measuring interference metrics includes:
measuring statistical interference metrics.

9. The method of claim 7, wherein said control channel transmissions are made using a synchronous protocol.

10. The method of claim 9, wherein said synchronous protocol comprises an IEEE 802.16 protocol.

11. The method of claim 7, further comprising:
selected ones of said client nodes providing a feedback message to said wireless communication node.

12. The method of claim 11 wherein said feedback message comprises channel quality information as determined by a respective one of said subscriber stations client nodes by monitoring said control channel transmissions.

13. The method of claim 11, further comprising:
said wireless communication node determining said selected ones of said client nodes from those client nodes most likely to need communication services.

14. The method of claim 13, wherein said determining said selected ones of said client nodes comprises:
using downlink queue information.

15. The method of claim 13, wherein said determining said selected ones of said client nodes comprises:
using time since last communication information.

16. The method of claim 13, wherein said determining said selected ones of said client nodes comprises:
using a access fairness determination.

17. The method of claim 7 wherein said control channel includes feedback message control information to control selected ones of said client nodes to provide a feedback message to said wireless communication node including interference metric information.

18. The method of claim 7, wherein said control channel includes a downlink map establishing downlink communication assignments with respect to one or more said client nodes in accordance with said real-time scheduling communications between said wireless communication node and said plurality of client nodes.

19. The method of claim 7, wherein said control channel includes an uplink map establishing uplink communication assignments with respect to one or more said client nodes in accordance with said real-time scheduling communications between said wireless communication node and said plurality of client nodes.

20. The method of claim 1, further comprising:
controlling selected ones of said client nodes to provide a feedback message including measured interference metrics information with respect to an associated downlink.

21. The method of claim 20, further comprising:
measuring instantaneous uplink interference metrics associated with particular client nodes by monitoring corresponding ones of said feedback messages.

22. The method of claim 1, wherein said real-time scheduling of communications in an uplink is controlled to provide uplink transmission reliability with minimized service level variability.

23. The method of claim 1, wherein said real-time scheduling of communications in a downlink is controlled to provide a desired downlink transmission bandwidth with minimized service level variability.

24. The method of claim 1, wherein said wireless communication node comprises a base station providing a plurality of wireless links.

25. The method of claim 24, wherein said base station utilizes a narrow beam antenna array in providing said plurality of wireless links.

26. The method of claim 24, wherein said client nodes comprise subscriber stations.

27. The method of claim 26, wherein said subscriber stations provide wireless links to a plurality of subscriber terminals using a protocol different than that implemented in a link between said subscriber station and said base station.

28. A method for providing wireless communications, said method comprising:
obtaining interference metrics for a plurality of wireless communication links, wherein said obtaining interference metrics includes determining a probability density function indicating interference plus noise during a fraction of time;
real-time scheduling downlink communications via ones of said plurality of wireless communication links using said interference metrics to provide high bandwidth throughput while reducing service level variability among said plurality of wireless communication links; and
real-time scheduling uplink communications via ones of said plurality of wireless communication links using said interference metrics to provide a high level of reliability with respect to uplinks of said plurality of wireless communication links;
wherein the real-time scheduling of downlink communications and uplink communications is performed by a wireless communication node through which communications over the wireless communication links transit.

29. The method of claim 28, further comprising:
enabling all frequency channels for use throughout all areas of a service area of a wireless network, said wireless network providing said plurality of wireless communication links.

30. The method of claim 28, wherein said plurality of wireless communication links are associated with a the wireless communication node in communication with a plurality of client nodes, wherein said wireless communication node schedules transmission independently such that transmission on a particular channel occurs only a fraction of the time and is randomly uniformly distributed over time.

31. The method of claim 28, wherein said wireless communication links are associated with a plurality of client nodes served by the wireless communication node wherein said real-time scheduling downlink communications reserves selection of client nodes having low interference associated therewith until other client nodes having higher interference associated therewith have been scheduled or are determined to have sufficiently high interference associated therewith that communication is undesirable.

32. The method of claim 28, wherein said wireless communication links are associated with a plurality of client nodes served by a the wireless communication node wherein said real-time scheduling uplink communications reserves selection of client nodes having low interference associated therewith until other client nodes having higher interference associated therewith have been scheduled or are determined to have sufficiently high interference associated therewith that communication is undesirable.

33. The method of claim 28, wherein said obtaining interference metrics includes:
 each of a plurality of client nodes continuously monitoring a control channel in a downlink;
 storing interference metric information as determined by said monitoring said control channel; and
 particular ones of said client nodes transmitting a feedback message in response to a feedback message control signal from a wireless communication node.

34. The method of claim 33, further comprising:
 selecting said particular ones of said client nodes from said plurality of client nodes as a function of client nodes most likely to need service by said wireless communication node.

35. The method of claim 34, wherein said selecting particular ones of said client nodes comprises:
 determining client nodes most likely to need service from transmission queue information.

36. The method of claim 34, wherein said selecting particular ones of said client nodes comprises:
 determining client nodes having a longest time since last communication.

37. The method of claim 33, wherein said obtaining interference metrics further includes:
 said wireless communication node monitoring said feedback messages to determine instantaneous interference in an uplink.

38. The method of claim 28, further comprising:
 determining a downlink map consistent with said scheduled downlink communications.

39. The method of claim 38, further comprising:
 transmitting said downlink map via said wireless communication links.

40. The method of claim 28, further comprising:
 determining an uplink map consistent with said scheduled uplink communications.

41. The method of claim 40, further comprising:
 transmitting said uplink map via said wireless communication links.

42. The method of claim 28, wherein said reducing service level variability results in a reduction in an achievable average throughput bandwidth while moving a minimum service level above an outage threshold service level.

43. A communication system comprising:
 a base station controller distinct from a set of subscriber stations wherein communications between subscriber stations transit through the base station controller and wherein the base station controller implements a synchronous point to multipoint (PTMP) protocol, the base station controller comprising:
  a memory storing interference metrics associated with a plurality of communication links of said communication system, wherein said interference metrics are determined from a probability density function indicating interference plus noise during a fraction of time; and
  a real-time scheduler in communication with said memory and applying a real-time scheduling algorithm to said interference metrics to real-time schedule communications via ones of said plurality of communication links to minimize variance of communication service levels associated with said plurality of communication links.

44. The system of claim 43, wherein the base station controller further comprising:
 a subscriber station controller having a processor operable to monitor a downlink control channel and derive a portion of said interference metrics therefrom, said subscriber station controller operable in response to a control signal from said base station controller to provide a feedback message including said portion of said interference metrics.

45. The system of claim 44, wherein said processor continuously monitors said down link control channel.

46. The system of claim 44, wherein said base station controller monitors said feedback message to determine an uplink interference metric comprising a portion of said interference metrics.

47. The system of claim 43, wherein service level variability minimization as provided by said real-time scheduler results in a reduction in an achievable average throughput bandwidth while moving a minimum service level above an outage threshold service level.

48. The system of claim 43, wherein said real-time scheduling algorithm reserves selection of subscriber stations having low interference associated therewith for scheduling until other subscriber stations having higher interference associated therewith have been scheduled or are determined to have sufficiently high interference associated therewith that communication is undesirable.

49. A method for scheduling wireless communications, said method comprising:
 providing a plurality of channels for use in each of a plurality of service area portions;
 determining link quality metrics with respect to links between a wireless communication node and a plurality of client nodes, wherein said determining link quality metrics includes determining a probability density function indicating interference plus noise during a fraction of time; and
 real-time scheduling communications, by the wireless communication node, between ones of said client nodes and said wireless communication node such that a first client node having acceptable link quality metrics with respect to a first channel of said plurality of channels experiencing high levels of interference is scheduled to use said first channel while a client node having poor link quality metrics with respect to each said channel of a service area portion is scheduled to use a second channel of said plurality of channels experiencing lower levels of interference than said first channel.

50. The method of claim 49, wherein said plurality of channels provided in each service area portion of a service area comprise a same set of channels.

51. The method of claim 49, wherein said wireless node schedules transmissions such that transmissions on a particular frequency channel occur only a fraction of the time and are randomly uniformly distributed over time.

52. The method of claim 50, wherein said service area comprises a base station service area and said plurality of service area portions comprise areas illuminated by adjacent antenna beams of said base station.

53. The method of claim 49, wherein said client nodes employ highly directional antennas directed toward said wireless communication node.

54. The method of claim 50, wherein said service area comprises a network service area including multiple base stations and said plurality of service area portions comprise areas illuminated by adjacent antenna beams of multiple ones of said base stations.

55. The method of claim 49, wherein said real-time scheduling communications comprises:
  implementing limited loading of each channel of said plurality of channels used in a service area portion.

56. The method of claim 55, wherein said implementing limited loading establishes a maximum loading for each channel corresponding to the reciprocal of a number of channels of said plurality of channels used in said service area portion.

57. The method of claim 56, wherein transmission for each channel is randomly uniformly time distributed.

58. The method of claim 49, wherein said real-time scheduling communications reserves selection of client nodes having low interference associated therewith, as determined from said link quality metrics, until other client nodes having higher interference associated therewith, as determined from said link quality metrics, have been scheduled or are determined to have sufficiently high interference associated therewith that communication is undesirable.

59. The method of claim 49, wherein said determining link quality metrics includes:
  ones of said plurality of client nodes continuously monitoring control channel transmissions from said wireless communication node.

60. The method of claim 59, wherein said control channel transmissions are made using a synchronous protocol.

61. The method of claim 59, wherein said control channel includes a down link map establishing downlink communication assignments with respect to one or more said client nodes in accordance with said real-time scheduling communications between said wireless communication node and said plurality of client nodes.

62. The method of claim 59, wherein said control channel includes an uplink map establishing uplink communication assignments with respect to one or more said client nodes in accordance with said real-time scheduling communications between said wireless communication node and said plurality of client nodes.

63. The method of claim 49, further comprising:
  selected ones of said client nodes providing a feed back message to said wireless communication node under control of said wireless communication node, said feedback message providing information with respect to said link quality metrics.

64. The method of claim 63, further comprising:
  said wireless communication node determining said selected ones of said client nodes from those client nodes most likely to need communication services.

65. The method of claim 63, wherein said determining said selected ones of said client nodes comprises:
  using downlink queue information.

66. The method of claim 63, wherein said determining said selected ones of said client nodes comprises:
  using time since last communication information.

67. The method of claim 63, wherein said determining said selected ones of said client nodes comprises:
  using a access fairness determination.

68. The method of claim 63, further comprising:
  measuring instantaneous uplink interference metrics associated with particular client nodes by monitoring corresponding ones of said feedback messages.

69. The method of claim 49, wherein said real-time scheduling of communications in an uplink is controlled to provide uplink transmission reliability with minimized service level variability.

70. The method of claim 49, wherein said real-time scheduling of communications in a downlink is controlled to provide a desired downlink transmission bandwidth with minimized service level variability.

71. The method of claim 49, wherein said wireless communication node utilizes a narrow beam antenna array in providing said plurality of wireless links.

* * * * *

UNITED STATES PATENT AND TRADEMARK OFFICE
CERTIFICATE OF CORRECTION

| | | |
|---|---|---|
| PATENT NO. | : 7,801,490 B1 | Page 1 of 1 |
| APPLICATION NO. | : 10/803172 | |
| DATED | : September 21, 2010 | |
| INVENTOR(S) | : Shimon B. Scherzer | |

It is certified that error appears in the above-identified patent and that said Letters Patent is hereby corrected as shown below:

In column 25, line 39, in Claim 12, after "one of said" delete "subscriber stations".

In column 25, line 54, in Claim 17, after "claim 7" insert -- , --.

In column 27, line 10, in Claim 32, after "served by" delete "a".

In column 27, line 10, in Claim 32, after "communication node" insert -- , --.

In column 28, line 24, in Claim 45, delete "down link" and insert -- downlink --.

In column 29, line 43, in Claim 61, delete "down link" and insert -- downlink --.

In column 30, line 11, in Claim 63, delete "feed back" and insert -- feedback --.

Signed and Sealed this
Third Day of April, 2012

David J. Kappos
*Director of the United States Patent and Trademark Office*